(12) United States Patent
Herard et al.

(10) Patent No.: US 11,193,821 B2
(45) Date of Patent: Dec. 7, 2021

(54) AMBIENT LIGHT SENSOR WITH LIGHT PROTECTION

(71) Applicant: STMICROELECTRONICS PTE LTD, Singapore (SG)

(72) Inventors: Laurent Herard, Singapore (SG); David Gani, Choa Chu Kang (SG)

(73) Assignee: STMicroelectronics Pte Ltd, Singapore (SG)

( * ) Notice: Subject to any disclaimer, the term of this patent is extended or adjusted under 35 U.S.C. 154(b) by 242 days.

(21) Appl. No.: 16/213,197

(22) Filed: Dec. 7, 2018

(65) Prior Publication Data

US 2019/0195685 A1 Jun. 27, 2019

Related U.S. Application Data (60) Provisional application No. 62/610,448, filed on Dec. 26, 2017.

(51) Int. Cl.
*H01J 40/14* (2006.01)
*G01J 1/02* (2006.01)
*G01J 1/42* (2006.01)

(52) U.S. Cl.
CPC .......... *G01J 1/0271* (2013.01); *G01J 1/0209* (2013.01); *G01J 1/4204* (2013.01)

(58) Field of Classification Search
CPC ....... G01J 1/4204; G01J 1/0271; G01J 1/0209
USPC ...................................................... 250/239
See application file for complete search history.

(56) References Cited

U.S. PATENT DOCUMENTS

| | | | | |
|---|---|---|---|---|
| 8,604,436 B1* | 12/2013 | Patel | ................... | H03K 17/941 |
| | | | | 250/338.1 |
| 2010/0117175 A1* | 5/2010 | Shizuno | ............ | H01L 27/14687 |
| | | | | 257/432 |
| 2013/0194464 A1* | 8/2013 | Suzuki | .............. | H01L 27/14627 |
| | | | | 348/294 |
| 2016/0307957 A1* | 10/2016 | A Tharumalingam | ...................... | |
| | | | | G01S 17/04 |
| 2017/0062628 A1* | 3/2017 | Shen | ..................... | H01L 31/143 |
| 2017/0186886 A1* | 6/2017 | Weng | ...................... | G01S 7/481 |
| 2017/0287886 A1* | 10/2017 | Gani | ..................... | G06F 3/0416 |
| 2019/0006561 A1* | 1/2019 | Chun-Hung | .......... | H01L 33/387 |
| 2020/0150270 A1* | 5/2020 | Goh | ...................... | G01J 1/4204 |

* cited by examiner

*Primary Examiner* — Georgia Y Epps
*Assistant Examiner* — Kevin Wyatt
(74) *Attorney, Agent, or Firm* — Seed Intellectual Property Law Group LLP (57) ABSTRACT

One or more embodiments are directed to ambient light sensor packages, and methods of making ambient light sensor packages. One embodiment is directed to an ambient light sensor package that includes an ambient light sensor die having opposing first and second surfaces, a light sensor on the first surface of the ambient light sensor die, one or more conductive bumps on the second surface of the ambient light sensor die, and a light shielding layer on at least the first surface and the second surface of the ambient light sensor die. The light shielding layer defines an opening over the light sensor. The ambient light sensor package may further include a transparent cover between the first surface of the ambient light sensor die and the light shielding layer, and an adhesive that secures the transparent cover to the ambient light sensor die.

20 Claims, 8 Drawing Sheets

AMBIENT LIGHT SENSOR WITH LIGHT PROTECTION

BACKGROUND

Technical Field

Embodiments of the present disclosure are directed to ambient light sensor packages and methods of forming ambient light sensor packages.

Description of the Related Art

Ambient light sensors are used to detect environmental light in a variety of electronic devices, such as smartphones, cameras, display devices and other devices. For example, in a smartphone, ambient light sensors sense the ambient light, which is used by the smartphone for various applications, including adjusting the brightness of the display, adjusting camera settings, and more.

Ambient light sensors are typically very sensitive to light contamination that may be present inside of the electronic device in which the ambient light sensor is included. In many electronic devices, such as a smartphone, the ambient light sensor is first installed on the device, and then a light isolating gasket is placed over the ambient light sensor to prevent stray light from entering the sensor. That is, the ambient light sensor is not packaged with light isolation material when it is fabricated and then shipped to a customer, e.g., a phone manufacturer. Instead, the manufacturer typically attaches the ambient light sensor to a board (e.g., by a reflow process), and then positions a separately provided light isolating gasket over the ambient light sensor in order to block stray light.

BRIEF SUMMARY

The present disclosure provides, in various embodiments, ambient light sensor (ALS) packages and methods of making ambient light sensor packages. One embodiment is directed to an ambient light sensor package that includes an ambient light sensor die, a light sensor, one or more conductive bumps, and a light shielding layer. The ambient light sensor die has opposing first and second surfaces. The light sensor is positioned on the first surface of the ambient light sensor die, or is formed in the ambient light sensor die and forms at least a portion of the first surface thereof. The one or more conductive bumps are formed on the second surface of the ambient light sensor die. The light shielding layer is provided on at least the first surface and the second surface of the ambient light sensor die, and defines an opening aligned with the light sensor.

In another embodiment, the present disclosure provides a method that includes: positioning a plurality of ambient light sensor assemblies in a mold cavity, each of the ambient light sensor assemblies including an ambient light sensor die having a light sensor at a first surface of the ambient light sensor die, and conductive bumps on a second surface of the ambient light sensor die, the second surface being opposite to the first surface; covering exposed portions of the ambient light sensor assemblies in the mold cavity with a light shielding layer; removing the ambient light sensor assemblies from the mold cavity; and forming separate ambient light sensor packages by sawing through portions of the light shielding layer between adjacent ambient light sensor assemblies.

In yet another embodiment, the present disclosure provides a method that includes: forming trenches in an ambient light sensor wafer, the trenches positioned between neighboring light sensors that form respective first portions of a first surface of the ambient light sensor wafer; forming a light shielding layer in the trenches and on second portions of the first surface of the ambient light sensor wafer; forming conductive bumps on a second surface of the ambient light sensor wafer, the second surface being opposite to the first surface; and sawing through portions of the light shielding layer in the trenches.

BRIEF DESCRIPTION OF THE SEVERAL VIEWS OF THE DRAWINGS

FIG. 1B is a top view of the ambient light sensor package shown in

FIG. 1A.

FIG. 2B is a top view of the ambient light sensor package shown in

FIG. 2A.

DETAILED DESCRIPTION

Embodiments are directed to ambient light sensor (ALS) packages, which may be used in a variety of electronic devices, including, for example, smartphones, tablet computer devices, display devices, and the like. The ALS packages provided herein may be used to sense an ambient light level, which is useful in a variety of applications, such as proximity sensing, brightness adjustment for a display, camera settings, and the like.

The ALS package includes an ambient light sensor that senses ambient light, and the ambient light sensor may be formed in an ambient light sensor die or on an upper surface of an ambient light sensor die, which may be formed of a semiconductor material such as silicon. A transparent protective cover, such as a layer of glass, may be provided over the ambient light sensor die to cover the ambient light sensor. A light shielding layer is provided on one or more of a lower surface of the ambient light sensor die, side surfaces of the ambient light sensor die, and at least partially over the upper surface of the ambient light sensor die. The light shielding layer defines an opening that is positioned over the ambient light sensor. Accordingly, the ambient light sensor can sense ambient light received through the opening in the light shielding layer, while stray light, e.g., from the sides or from below the substrate, is blocked by the light shielding layer. The light shielding layer may be formed of any light shielding material, for example, an epoxy molding compound.

Figure 1A:
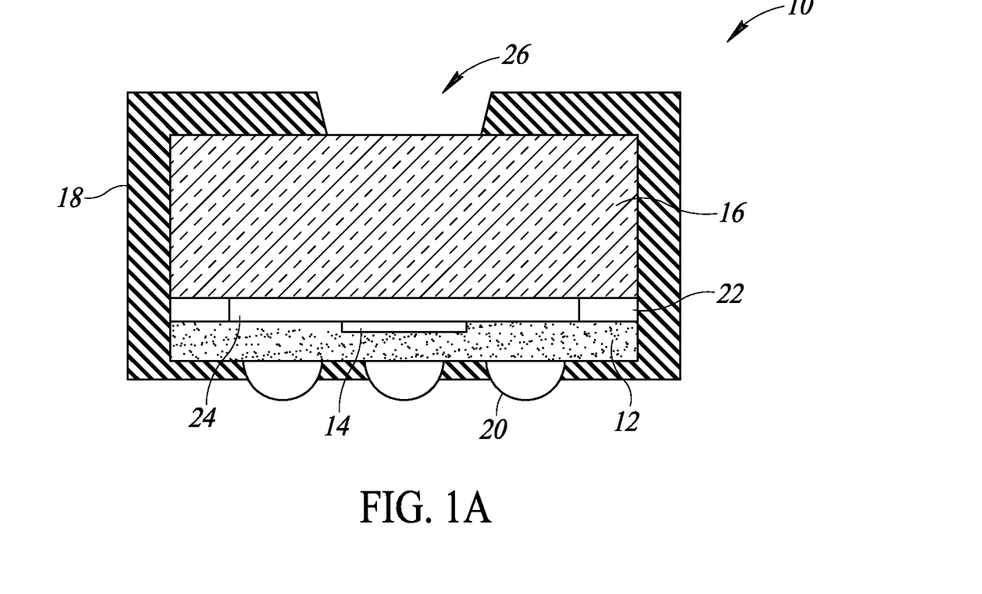
FIG. 1A is a cross-section view of an ambient light sensor package with a transparent cover, in accordance with one or more embodiments.
Figure 1B:
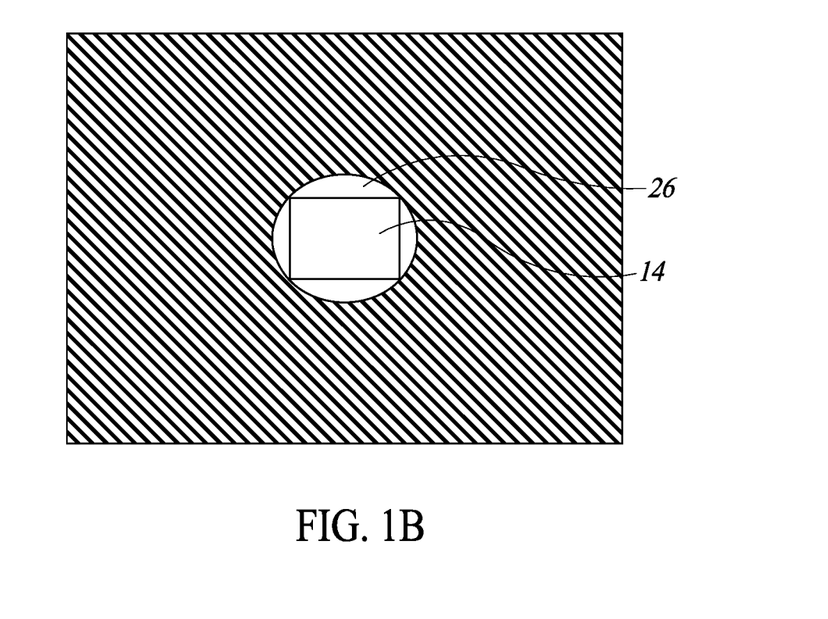

FIG. 1A is a cross-sectional view of an ambient light sensor package 10 according to one or more embodiments of the present disclosure. FIG. 1B is a top view of the ambient light sensor package 10.

The ALS package 10 includes an ambient light sensor die 12, a transparent cover 16, and a light shielding layer 18. The ambient light sensor die 12 is made from a semiconductor material, such as silicon. The ambient light sensor die 12 includes an active surface that includes one or more electrical components, such as integrated circuits. The integrated circuits may be analog or digital circuits implemented as active devices, passive devices, conductive layers, and dielectric layers formed within the die and electrically interconnected according to the electrical design and function of the die. In particular, the ambient light sensor die 12 may include electrical components that form an Application Specific Integrated Circuit (ASIC). Thus, the ambient light sensor die 12 may include circuitry to send, receive, and analyze electrical signals as is well known in the art. In the illustrated embodiment, the active surface is at the upper surface of the ambient light sensor die 12. The upper surface of the ambient light sensor die 12, as shown in FIG. 1A, is opposite to a lower surface of the ambient light sensor die 12 on which conductive bumps 20 are formed.

A light sensor 14 may be formed in or otherwise coupled to the upper surface of the ambient light sensor die 12. For example, the light sensor 14 may be integrally formed within the ambient light sensor die 12, as shown in FIG. 1A, such that an upper surface of the light sensor 14 is coplanar with the upper surface of the ambient light sensor die 12. Alternatively, in one or more embodiments, the light sensor 14 may be separate from the ambient light sensor die 12, and the light sensor 14 may be positioned on and electrically coupled to the upper surface of the ambient light sensor die 12. In one or more embodiments, the light sensor 14 may be or include one or more light sensing elements, which may be or include any photosensor, such as one or more photodiodes or the like configured to sense ambient light.

The transparent cover 16 is attached to the upper surface of the ambient light sensor die 12 by an adhesive material 22. The adhesive material 22 may be any material suitable for securing the transparent cover 16 to the ambient light sensor die 12, such as tape, paste, glue, or any other suitable material.

The transparent cover 16 may be formed of any optically transparent material, and in one or more embodiments, the transparent cover 16 is made of glass. In one or more embodiments, the adhesive material 22 is provided at edge regions of the upper surface of the ambient light sensor die 12, as shown in FIG. 1A. In such a case, a gap 24 may be formed between the upper surface of the ambient light sensor die 12 and a lower surface of the transparent cover 16, as shown. The gap 24 may be an air gap between the ambient light sensor die 12 and the transparent cover 16. Alternatively, the adhesive material 22 may be provided over the entire upper surface of the ambient light sensor die 12, in which case, the adhesive material 22 may be an optically transparent adhesive material.

Conductive bumps 20, such as solder balls or the like, are formed on a lower surface of the ambient light sensor die 12 and are coupled to conductive pads or other conductive material on the lower surface of the ambient light sensor die 12. The conductive bumps 20 facilitate electrical and mechanical coupling of the ambient light sensor die 12 to external circuitry. For example, the conductive bumps 20 are electrically coupled to the light sensor 14, as well as various circuitry that may be formed in or on the ambient light sensor die 12, through one or more electrical wires, conductive vias or the like formed in the ambient light sensor die 12.

The light shielding layer 18 substantially surrounds the ambient light sensor die 12, the transparent cover 16, and the adhesive 22, as shown in FIG. 1A. The light shielding layer 18 defines an opening 26 over a portion of the transparent cover 16, and the opening 26 is positioned over and aligned with the light sensor 14. As can be seen from the top view of FIG. 1B, the light sensor 14 is aligned with the opening 26 such that the entire surface of the light sensor 14 fits within an area defined by the opening 26. In operation, ambient light can pass through the opening 26, through the transparent cover 16, and may be sensed by the light sensor 14. However, the light shielding layer 18 blocks stray light, e.g., from the sides and from below the ALS package 10, from becoming incident on the light sensor 14. The light shielding layer 18 may be formed on the lower surface of the ambient light sensor die 12, with at least a portion of the conductive bumps 20 being exposed or otherwise uncovered by the light shielding layer 18, as shown. For example, as shown in FIG. 1A, the light shielding layer 18 may substantially surround the conductive bumps 20, except for an outermost portion of the conductive bumps 20, which provide a contact point for electrically connecting the conductive bumps 20 to other circuitry. More specifically, the conductive bumps may extend outwardly from the lower surface of the ambient light sensor die 12 to a greater distance that does the light shielding layer 18, as shown.

The light shielding layer 18 may be any opaque or otherwise non-transparent material. In one or more embodiments, the light shielding layer 18 is an opaque epoxy molding compound.

Figure 2A:
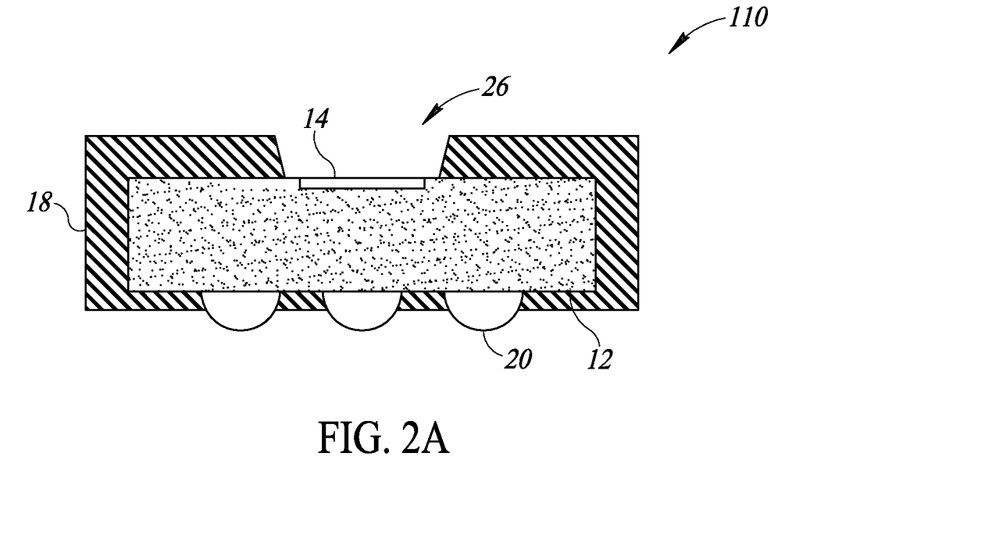
FIG. 2A is a cross-section view of an ambient light sensor package without a transparent cover, in accordance with one or more embodiments.
Figure 2B:
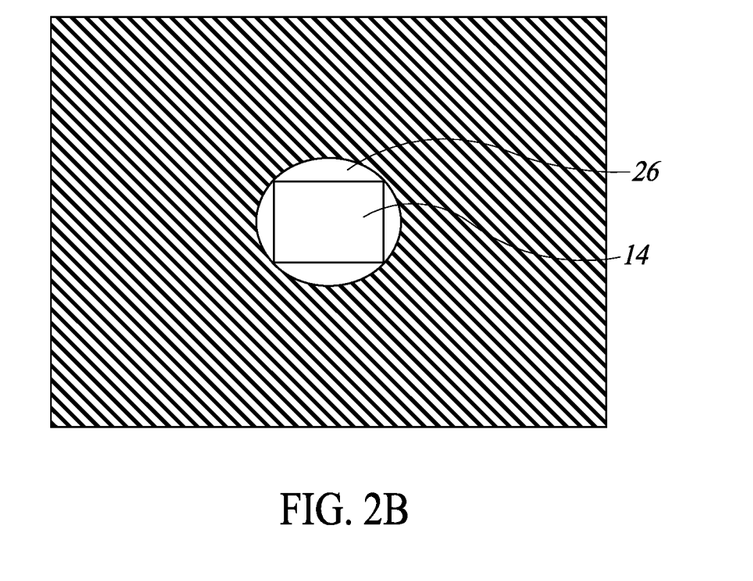

FIG. 2A is a cross-sectional view of another ambient light sensor package 110 according to one or more embodiments of the present disclosure. FIG. 2B is a top view of the ambient light sensor package 110. The ambient light sensor package 110 shown in FIGS. 2A and 2B is similar in structure and function to the ambient light sensor package 10 of FIGS. 1A and 1B, except for the differences that will be discussed below. The features shared by the optical sensors 110 and 10 will not be described herein again in the interest of brevity.

The main difference between the ambient light sensor package 110 shown in FIGS. 2A and 2B and the ambient light sensor package 10 shown in FIGS. 1A and 1B is that the ambient light sensor package 110 does not include the transparent cover 16 or the adhesive material 22. Instead, in the ambient light sensor package 110, the light shielding layer 18 is formed on the lower surface, side surfaces, and the upper surface of the ambient light sensor die 12. The opening 26 is formed over the light sensor 14, and the light sensor 14 may be aligned with the opening 26 such that the entire surface of the light sensor 14 fits within the area defined by the opening 26, as shown in the top view of FIG. 2B.

Although the ambient light sensor die 12 is shown as being thicker in FIG. 2A than in FIG. 1A, it should be readily appreciated that the ambient light sensor die 12 of FIG. 2A may be the same or different thickness as that of FIG. 1A.

FIGS. 3A-3D are cross-section views illustrating a method of making the ambient light sensor package 10 of FIGS. 1A and 1B according to one embodiment.

Figure 3A:
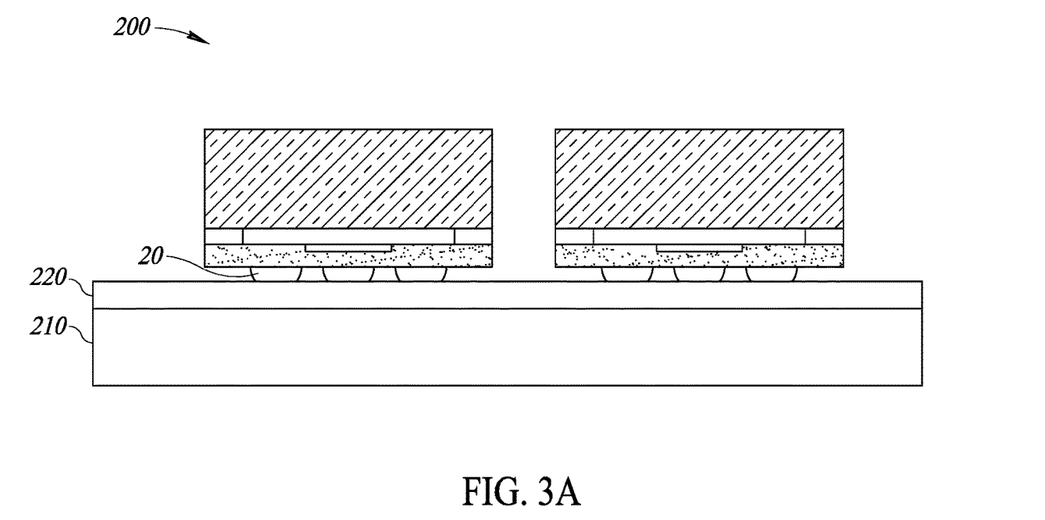
FIGS. 3A through 3D are cross-section views illustrating a method of making the ambient light sensor package shown in FIGS. 1A and 1B, in accordance with one or more embodiments.

As shown in FIG. 3A, ambient light sensor assemblies 200 are positioned on a carrier 210. The ambient light sensor assemblies 200 may be secured to the carrier 210 in a desired positional relationship by tape 220, or any adhesive material or other material suitable to secure the assemblies 200 to the carrier 210. At least a portion of the conductive bumps 20 are pressed into the tape 220, which prevents these portions of the conductive bumps 20 from being covered by light shielding layer 18 in a later step.

The ambient light sensor assemblies 200 are substantially the same as the completed ambient light sensor package 10; however, the ambient light sensor assemblies 200 do not yet include the light shielding layer 18.

Figure 3B:
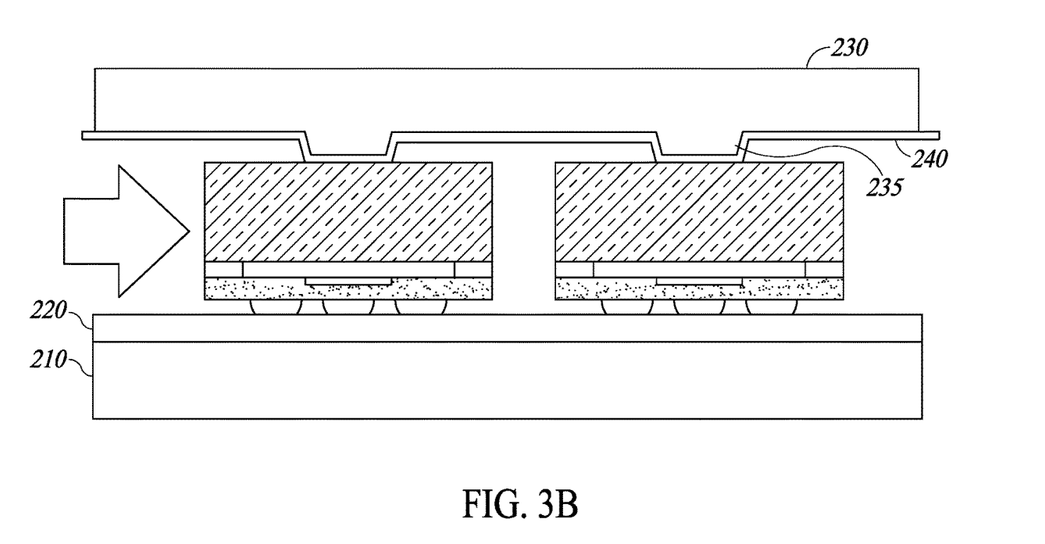

As shown in FIG. 3B, the ambient light sensor assemblies 200 are carried on the carrier 210 and tape 220 into a mold cavity defined at least partially by a mold 230, where film assist molding and/or expose die transfer molding processes are performed to apply the light shielding layer 18 to exposed surfaces of the ambient light sensor assemblies 200. In a film assist molding process, a film 240, such as a plastic film or the like, may be applied to an inner surface of the mold 230 before the ambient light sensor assemblies 200 are brought into the mold cavity on the carrier 210. The mold 230 is then brought downward, and protrusions 235 of the mold 230 are brought into contact with upper surfaces of the ambient light sensor assemblies 200. More particularly, the film 240 is brought into contact with the upper surfaces of the ambient light sensor assemblies 200. The protrusions 235 of the mold 230 are sized as desired to form openings 26 in the completed ambient light sensor packages 10 having desired dimensions.

Once the ambient light sensor assemblies 200 are desirably positioned within the mold cavity and the mold 230 is positioned for molding, the light shielding layer 18 is formed on the exposed surfaces of the ambient light sensor assemblies 200 by transfer molding. More specifically, the light shielding layer 18 may be liquefied by heat and pressure and then forced into the closed mold cavity, for example, as shown by the arrow in FIG. 3B. The light shielding layer 18 may be held in the mold cavity until it has sufficiently cured or solidified.

Figure 3C:
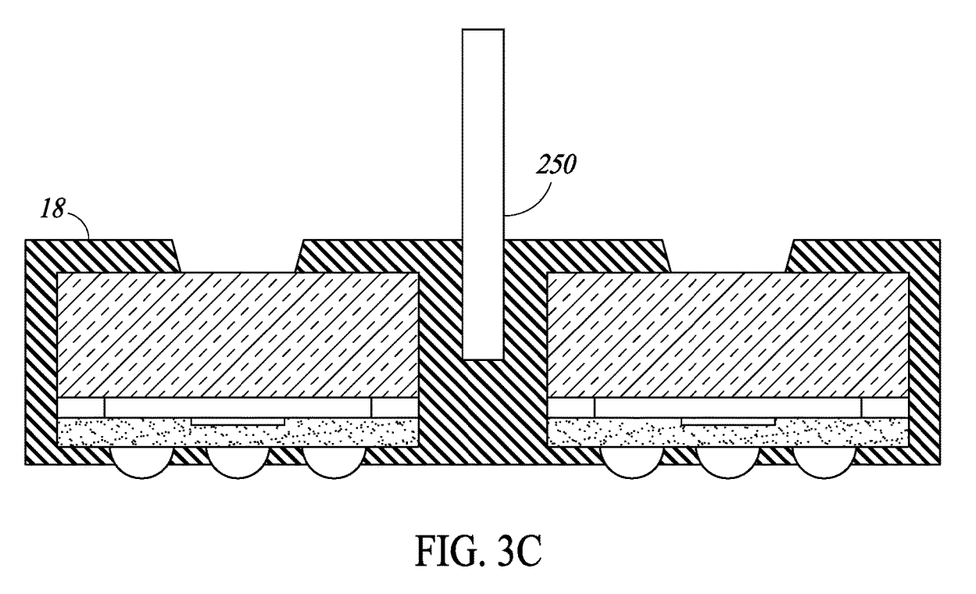

As shown in FIG. 3C, after the light shielding layer 18 has cured, the mold may be opened and the ambient light sensor assemblies 200 are substantially encapsulated by the light shielding layer 18. The portions of the conductive bumps 20 that were pressed into the tape 220 during molding remain uncovered by the light shielding layer 18. The light shielding layer 18 defines openings 26, which were formed due to the placement of the protrusions 235 on an upper surface of the assemblies 200 during molding. Additionally, the light shielding layer 18 is formed between the ambient light sensor assemblies 200, as the assemblies 200 were spaced apart from one another during the molding. The assemblies 200 are separated from one another by any sawing method through the portion of light shielding layer 18 between the assemblies 200 using a saw 250 or any other suitable tool or process.

Figure 3D:
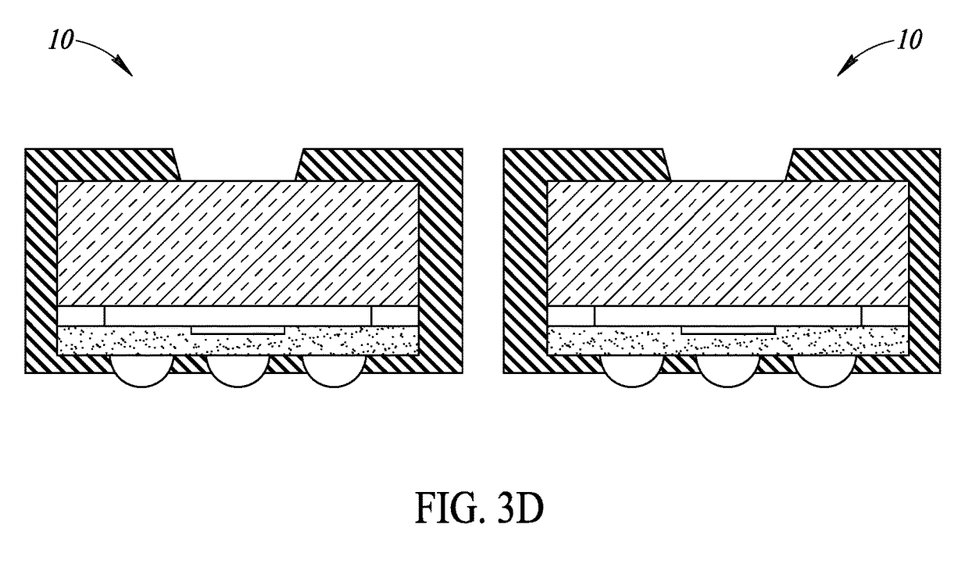

As shown in FIG. 3D, two separate ambient light sensor packages 10 are formed after separating the assemblies 200. Although the examples provided herein illustrate the formation of two separate ambient light sensor packages, it should be readily appreciated that any number of ambient light sensor packages may be formed in a same process.

FIGS. 4A-4G are cross-section views illustrating a method of making an ambient light sensor package 310 according to one embodiment. The ambient light sensor package 310 is similar to the ambient light sensor package 110 of FIGS. 2A and 2B, except the light shielding layer 18 is not formed on a lower surface of the ambient light sensor package 310.

Figure 4A:
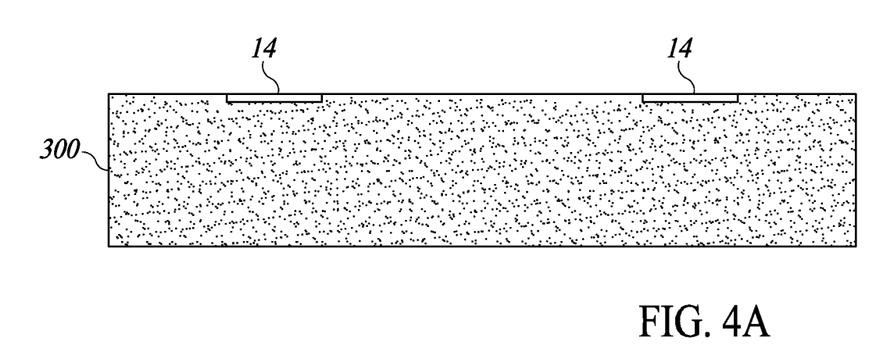
FIGS. 4A through 4G are cross-section views illustrating a method of making another ambient light sensor package, in accordance with one or more embodiments.

As shown in FIG. 4A, an ambient light sensor wafer 300 is provided, and includes a plurality of light sensors 14 which are formed in or otherwise electrically coupled to the ambient light sensor wafer 300. The ambient light sensor wafer 300 includes various wiring and circuitry coupled to the light sensors 14. For example, the ambient light sensor wafer 300 may include a plurality of ambient light sensor dies 12 before cutting the individual dies 12.

Figure 4B:
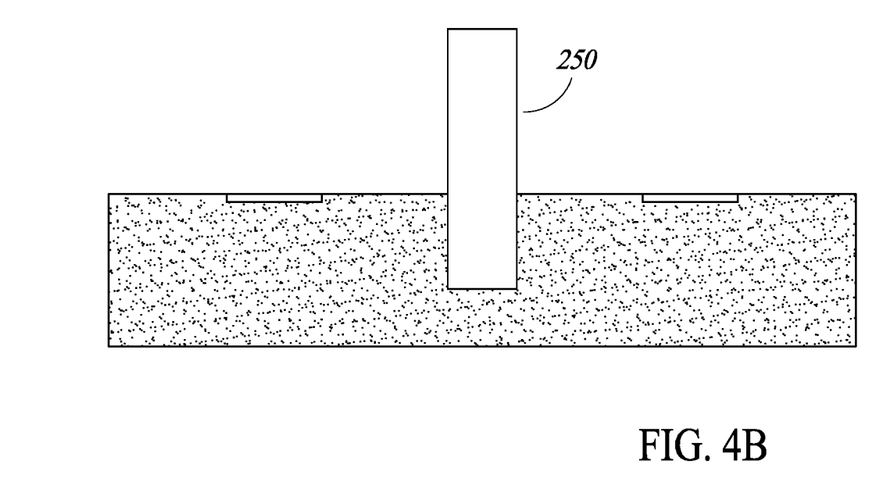

As shown in FIG. 4B, the ambient light sensor wafer 300 is partially cut, for example, by sawing into the ambient light sensor wafer 300 with a saw 250. The ambient light sensor wafer 300 is cut to a selected depth, which may be, for example, a half-cut which cuts halfway into a thickness of the ambient light sensor wafer 300. A plurality of half-cuts may be formed in the ambient light sensor wafer 300 at locations between neighboring light sensors 14.

Figure 4C:
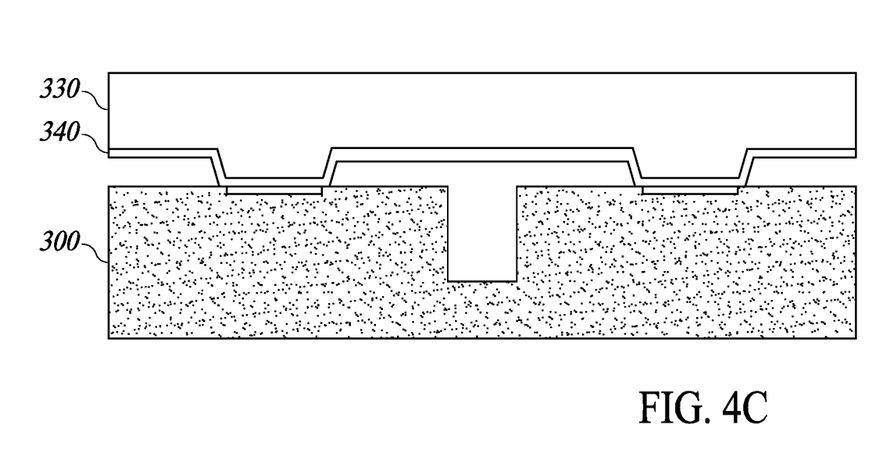

As shown in FIG. 4C, the half-cut of the ambient light sensor wafer 300 forms a trench in the ambient light sensor wafer 300. The ambient light sensor wafer 300 is positioned in a mold cavity defined at least partially by a mold 330, where film assist molding and/or expose die transfer molding processes are performed to apply the light shielding layer 18 to exposed surfaces of the ambient light sensor wafer 300. The mold 330 may be the same as or similar to the mold 230 shown in FIG. 3B. Similarly, a film 340, such as a plastic film or the like, may be applied to an inner surface of the mold 330 before the ambient light sensor wafer 300 is brought into the mold cavity. The film 340 may be the same as or similar to the film 240 shown in FIG. 3B. The mold 330 is then brought downward, and protrusions of the mold 330 are brought into contact with upper surfaces of the ambient light sensor wafer 300, and the light shielding layer 18 is introduced into the mold cavity and cured in a same or similar way as described above, for example, with respect to FIG. 3B.

Figure 4D:
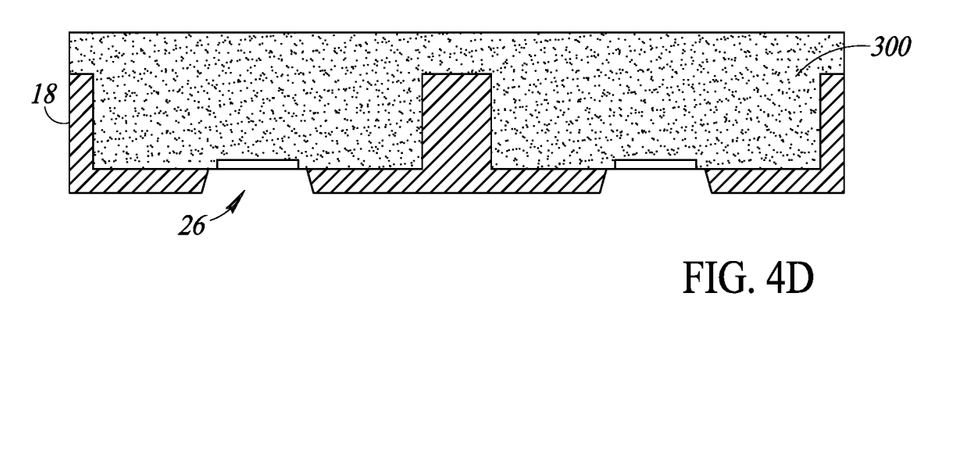

As shown in FIG. 4D, after the light shielding layer 18 has cured, the mold may be opened and the light shielding layer 18 covers much of the active surface of the ambient light sensor wafer 300 (i.e., the surface where the light sensors 14 are formed), as well as the trenches that were formed by sawing, e.g., by half-cuts in regions between neighboring light sensors 14. The light shielding layer 18 defines openings 26, which were formed due to the placement of the protrusions of the mold 330 over the light sensors 14 during molding.

Figure 4E:
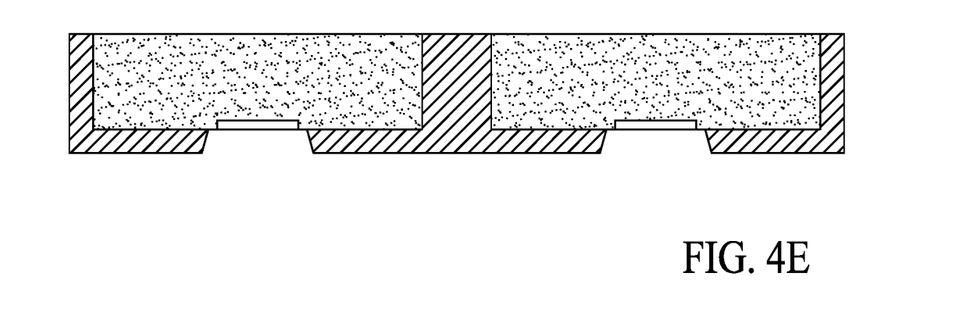

As shown in FIG. 4E, a non-active portion of the ambient light sensor wafer 300 may be removed, for example, by backgrinding or any other suitable technique. The backgrinding may be performed to remove enough thickness of the non-active portion of the ambient light sensor wafer 300 so that the light shielding layer 18 that was formed in the half-cut trenches is exposed along the surface that was formed by backgrinding.

Figure 4F:
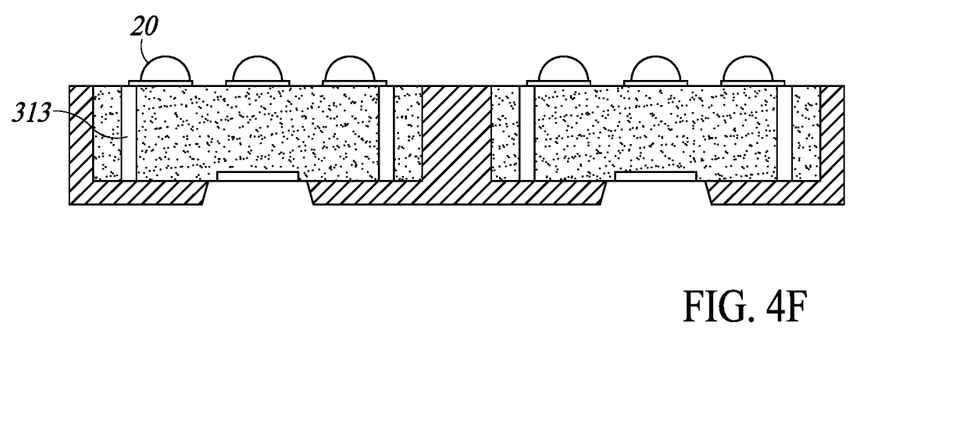

As shown in FIG. 4F, conductive vias 313 and/or any other conductive wiring for the ambient light sensor package may be formed in the ambient light sensor wafer 300, and conductive bumps 20 may be formed on the surface of the ambient light sensor wafer 300 opposite to the light sensor 14. The conductive vias 313 may be formed by any suitable technique. The conductive bumps 20 may be formed on conductive pads that electrically couple the conductive bumps 20 to one or more conductive vias 313, conductive wiring, and/or electrical circuitry formed in the ambient light sensor wafer 300.

Figure 4G:
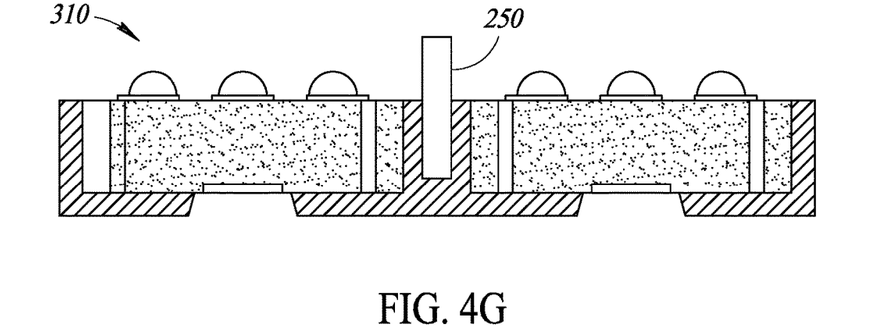

As shown in FIG. 4G, the ambient light sensor packages 310 are separated from one another by sawing through the portion of light shielding layer 18 that was formed in the trenches between neighboring light sensors 14. The sawing may be accomplished using a saw 250 or any other suitable tool or method. The completed ambient light sensor packages 310 are substantially the same as the ambient light sensor package 110 shown in FIGS. 2A and 2B, except that the light shielding layer 18 is not formed on the lower surface of the ambient light sensor package 310. That is, the surface of the ambient light sensor package 310 where the conductive bumps 20 are formed does not include the light shielding layer 18. However, in alternative embodiments, that surface may include the light shielding layer 18 between the conductive bumps 20, as in the ambient light sensor package 110 shown in FIGS. 2A and 2B.

FIGS. 5A-5E are cross-section views illustrating a method of making an ambient light sensor package 410 according to one embodiment. The ambient light sensor package 410 is similar to the ambient light sensor package 110 of FIGS. 2A and 2B, except a protective cover 416 is included in the ambient light sensor package 410.

Figure 5A:
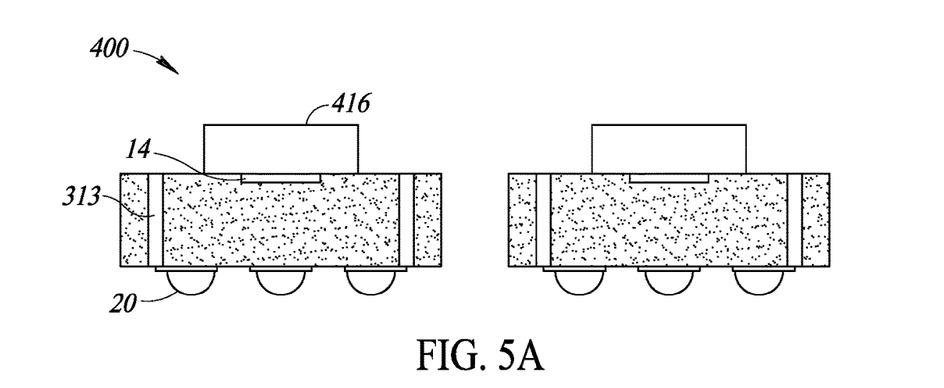
FIGS. 5A through 5E are cross-section views illustrating a method of making another ambient light sensor package, in accordance with one or more embodiments.

As shown in FIG. 5A, ambient light sensor assemblies 400 are provided. The ambient light sensor assemblies 400 include the ambient light sensor die 12, the light sensor 14 which may be formed in or on the ambient light sensor die 12, conductive bumps 20 and one or more conductive vias 313. The ambient light sensor assemblies 400 further include a protective cover 416 covering the light sensor 14.

Figure 5B:
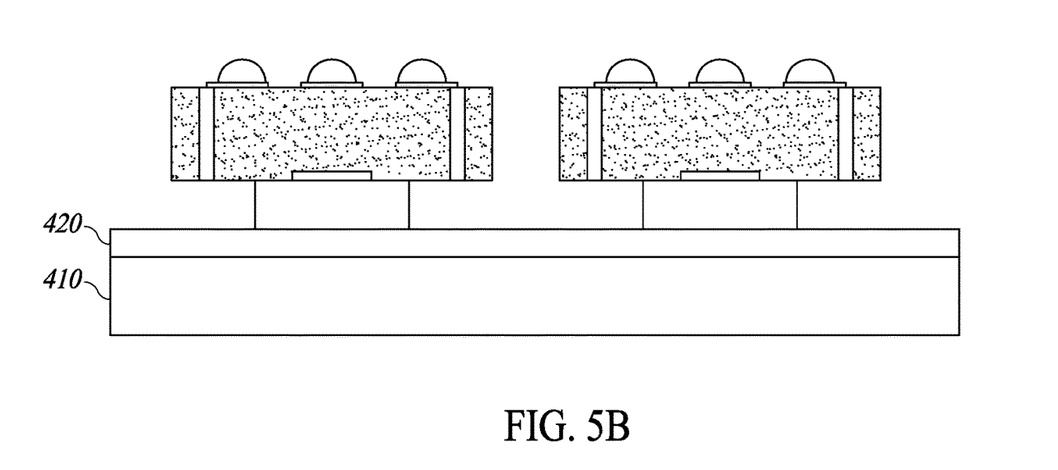

As shown in FIG. 5B, the ambient light sensor assemblies 400 are positioned on a carrier 410. The ambient light sensor assemblies 400 may be secured to the carrier 410 in a desired positional relationship by tape 420, or any adhesive material or other material suitable to secure the assemblies 400 to the carrier 410. This is substantially the same as the positioning of the ambient light sensor assemblies 200 on the carrier 210 shown in FIG. 3B, except in FIG. 5B, the ambient light sensor assemblies 400 are positioned upside-down, such that the protective cover 416 is positioned on the tape 420.

Figure 5C:
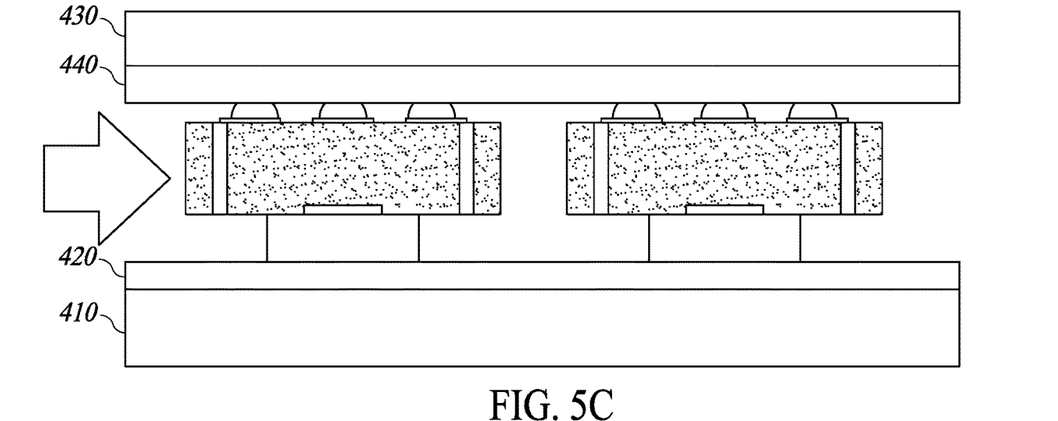

As shown in FIG. 5C, the ambient light sensor assemblies 400 are carried on the carrier 410 and tape 420 into a mold cavity defined at least partially by a mold 430, where film assist molding and/or expose die transfer molding processes are performed to apply the light shielding layer 18 to exposed surfaces of the ambient light sensor assemblies 400. The mold 430 may have a substantially planar surface, and a film 440, such as a plastic film or the like, may be applied to the surface of the mold 430 before the ambient light sensor assemblies 400 are brought into the mold cavity on the carrier 410.

The mold 430 is then brought downward until the film 440 presses at least partially into the conductive bumps 20, and the light shielding layer 18 is introduced into the mold cavity, for example, as shown by the arrow in FIG. 5C, and cured in a same or similar way as described above, for example, with respect to FIG. 3B.

Figure 5D:
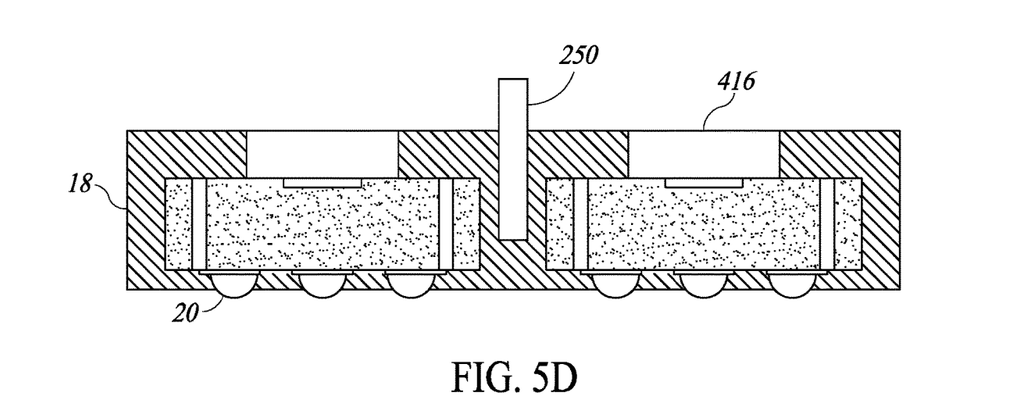

As shown in FIG. 5D, after the light shielding layer 18 has cured, the mold may be opened and the ambient light sensor assemblies 400 are substantially encapsulated by the light shielding layer 18. The portions of the conductive bumps 20 that were pressed into the film 440 during molding remain uncovered by the light shielding layer 18. Similarly, an upper surface of the protective cover 416 is not covered by the light shielding layer 18, as that surface was on the tape 420 during the molding.

The protective cover 416 may be an optically transparent layer, or in other embodiments, the protective cover 416 may be non-transparent, such as an opaque layer. In embodiments where the protective cover 416 is a transparent cover, the protective cover 416 may remain in place in the final ambient light sensor package and may define a part of an optical path for light to be received by the light sensor 14, since the light shielding layer 18 is formed only on side surfaces of the protective cover 416.

Figure 5E:
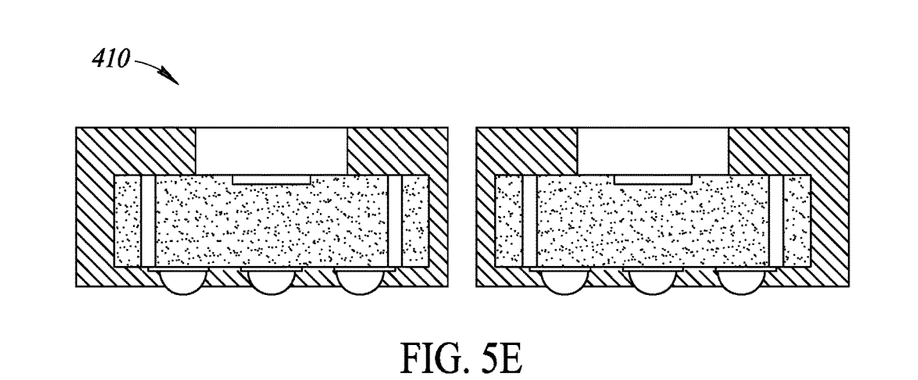

As shown in FIG. 5E, the ambient light sensor packages 410 are formed by sawing through the portion of light shielding layer 18 between neighboring ambient light sensor dies 12 using a saw 250 or any other suitable tool or process.

The protective cover 416 may remain in place in the final ambient light sensor package 410, or it may be removed to form an opening in the void formed by removing the protective cover 416.

The present disclosure provides various embodiments of ambient light sensor packages and methods of forming ambient light sensor packages. The ambient light sensor packages provided by the present disclosure include a light shielding layer 18 on at least one surface of the packages. In various embodiments, the light shielding layer 18 may be formed on two or more surfaces of the packages.

The ambient light sensor packages provided herein have several advantages with respect to previous ambient light sensor packages, including, for example, lower cost, better light isolation, smaller and thinner shape, and optical testing may be performed before sawing to form separate packages. For example, because the ambient light sensor packages may be at least partially encapsulated by the light shielding layer 18 before they are sawed into separate packages, optical testing may be performed prior to the sawing. This allows for simpler optical testing which can be performed on many ambient light sensor assemblies at the same time, prior to sawing the assemblies to yield complete ambient light sensor packages.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An ambient light sensor package, comprising:
    an ambient light sensor die having opposing first and second surfaces;
    a light sensor on the first surface of the ambient light sensor die;
    one or more conductive bumps on the second surface of the ambient light sensor die; and
    a light shielding layer on at least the first surface and the second surface of the ambient light sensor die, the light shielding layer defines an opening aligned with the light sensor.

2. The ambient light sensor package of claim 1 wherein the light sensor is in the ambient light sensor die, and a second surface of the light sensor is coplanar with the first surface of the ambient light sensor die.

3. The ambient light sensor package of claim 1, further comprising:
    a transparent cover between the first surface of the ambient light sensor die and the light shielding layer; and
    an adhesive that secures the transparent cover to the ambient light sensor die.

4. The ambient light sensor package of claim 3 wherein the transparent cover is glass.

5. The ambient light sensor package of claim 3 wherein the adhesive is glue.

6. The ambient light sensor package of claim 1 wherein the light shielding layer is an epoxy molding compound.

7. The ambient light sensor package of claim 1 wherein the light shielding layer is a continuous layer that surrounds the ambient light sensor die except for portions of the ambient light sensor die corresponding to respective positions of the opening and the one or more conductive bumps.

8. The ambient light sensor package of claim 7 wherein portions of the one or more conductive bumps protrude through the light shielding layer.

9. A method, comprising:
   positioning a plurality of ambient light sensor assemblies in a mold cavity, each of the ambient light sensor assemblies including an ambient light sensor die having a light sensor at a first surface of the ambient light sensor die, and conductive bumps on a second surface of the ambient light sensor die, the second surface being opposite to the first surface;
   covering exposed portions of the ambient light sensor assemblies in the mold cavity with a light shielding layer on at least the first surface and the second surface of the ambient light sensor die;
   removing the ambient light sensor assemblies from the mold cavity; and
   forming separate ambient light sensor packages by sawing through portions of the light shielding layer between adjacent ambient light sensor assemblies.

10. The method of claim 9 wherein positioning the plurality of ambient light sensor assemblies in the mold cavity includes contacting portions of the ambient light sensor assemblies over the light sensors with respective protruding portions of a mold, wherein the portions of the ambient light sensor assemblies over the light sensors correspond with openings that are subsequently formed by the covering exposed portions of the ambient light sensor assemblies in the mold cavity with the light shielding layer.

11. The method of claim 10 wherein the protruding portions of the mold include a layer of film that contacts the portions of the ambient light sensor assemblies over the light sensors.

12. The method of claim 9 wherein covering exposed portions of the ambient light sensor assemblies in the mold cavity with a light shielding layer includes covering the exposed portions with an epoxy molding compound.

13. The method of claim 9 wherein each of the plurality of ambient light sensor assemblies further include a protective cover over the light sensor on the first surface of the ambient light sensor die, and positioning the plurality of ambient light sensor assemblies in the mold cavity includes positioning the transparent covers of each of the plurality of ambient light sensor assemblies on a layer of tape on a carrier in the mold cavity.

14. The method of claim 13, further comprising:
   removing the protective covers from each of the plurality of light sensor assemblies subsequent to the removing the ambient light sensor assemblies from the mold cavity.

15. The method of claim 13 wherein positioning the plurality of ambient light sensor assemblies in the mold cavity includes pressing a film on a mold onto the conductive bumps, the film at least partially surrounding portions of the conductive bumps.

16. The method of claim 9 wherein positioning the plurality of ambient light sensor assemblies in the mold cavity includes pressing the conductive bumps at least partially into a layer of tape on a carrier.

17. A method, comprising:
   forming trenches in an ambient light sensor wafer, the trenches positioned between neighboring light sensors that form respective first portions of a first surface of the ambient light sensor wafer;
   forming, in a mold cavity, a light shielding layer in the trenches and on second portions of the first surface of the ambient light sensor wafer;
   forming conductive bumps on a second surface of the ambient light sensor wafer, the second surface being opposite to the first surface; and
   sawing through portions of the light shielding layer in the trenches.

18. The method of claim 17, further comprising:
   backgrinding the ambient light sensor wafer to form the second surface prior to forming the conductive bumps.

19. The method of claim 17 wherein forming the light shielding layer in the trenches and on second portions of the first surface of the ambient light sensor wafer includes performing a transfer mold process to form the light shielding layer.

20. The method of claim 17 wherein forming the light shielding layer includes forming an epoxy molding compound in the trenches and on second portions of the first surface of the ambient light sensor wafer.

* * * * *